(12) United States Patent
Lakshmipathy

(10) Patent No.: US 11,606,319 B2
(45) Date of Patent: Mar. 14, 2023

(54) INTELLIGENT ANALYSIS OF DIGITAL SYMBOLS FOR MESSAGE CONTENT DETERMINATION

(71) Applicant: PAYPAL, INC., San Jose, CA (US)

(72) Inventor: Dhamodharan Lakshmipathy, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 63 days.

(21) Appl. No.: 17/062,125

(22) Filed: Oct. 2, 2020

(65) Prior Publication Data

US 2022/0109646 A1    Apr. 7, 2022

(51) Int. Cl.
| | |
|---|---|
| *H04L 51/046* | (2022.01) |
| *G06F 40/58* | (2020.01) |
| *G06F 40/30* | (2020.01) |
| *H04L 67/50* | (2022.01) |
| *H04L 51/10* | (2022.01) |

(52) U.S. Cl.
CPC ............ *H04L 51/046* (2013.01); *G06F 40/30* (2020.01); *G06F 40/58* (2020.01); *H04L 51/10* (2013.01); *H04L 67/535* (2022.05)

(58) Field of Classification Search
CPC ......... G06F 40/30; G06F 40/58; H04L 51/10; H04L 51/046; H04L 67/22
See application file for complete search history.

(56) References Cited

U.S. PATENT DOCUMENTS

| | | | | |
|---|---|---|---|---|
| 11,019,015 | B1* | 5/2021 | Shapira | .................. H04L 51/32 |
| 2018/0260385 | A1* | 9/2018 | Fan | ........................ G06F 40/30 |
| 2020/0104316 | A1* | 4/2020 | Dimson | .............. G06F 16/5838 |
| 2020/0110794 | A1* | 4/2020 | Vos | ....................... G06F 40/279 |

OTHER PUBLICATIONS

Chen, Yahui. Convolutional neural network for sentence classification. MS thesis. University of Waterloo, 2015. (Year: 2015).*
Liu, Ping, Wen Li, and Liang Zou. "NULI at SemEval-2019 task 6: Transfer learning for offensive language detection using bidirectional transformers." Proceedings of the 13th international workshop on semantic evaluation. 2019. (Year: 2019).*

* cited by examiner

*Primary Examiner* — Soe Hlaing
(74) *Attorney, Agent, or Firm* — Haynes and Boone, LLP

(57) ABSTRACT

There are provided systems and methods for intelligent analysis of digital symbols for message content determination. A user may engage in messaging with another user, such as using a messaging platform that may include electronic transaction processing through a service provider. The service provider may have compliance rules, such as to avoid illegal, fraudulent, or otherwise noncompliant electronic transaction processing. In this regard, messaging between users may be analyzed to detect noncompliant messaging and activities by users on the service provider's platforms. The messages may include graphical images or icons, which may be converted to text so that plain text of the message may be analyzed. This may be done through a mapping of images-to-text, as well as an artificial intelligence model train to convert images into text. Thereafter, the plain text may be analyzed to determine if the message violates any compliance rules.

20 Claims, 6 Drawing Sheets

| | | Input Data 206 | Target Data 208 |
|---|---|---|---|
| Emojis 202 | 210 → | 🔫 Shipment | Gun Shipment |
| | 212 | 💊 Deal$ | Drug deal |

| | | Input Data 214 | Target Data 216 |
|---|---|---|---|
| Emoticons 204 | 218 → | C☻B⅔ | Cuba |
| | 220 → | ●~* making | Bomb making |
| | 222 → | (´─`)y-~~ | Smoke Cigarette Cuban cigar |
| | 224 → | (˘˘) leather | Animal leather |

| | Input Data 234 | Target Data 236 |
|---|---|---|
| Images 230 |  238 | Cuba |
| Symbols 232 | Input Data 240  244 | Target Data 242 Gun |

> US 11,606,319 B2

INTELLIGENT ANALYSIS OF DIGITAL SYMBOLS FOR MESSAGE CONTENT DETERMINATION

TECHNICAL FIELD

The present application generally relates to intelligent analysis of visual message content and more particularly to detecting noncompliant message content through conversion of graphical images to plain text.

BACKGROUND

Users may utilize online platforms to exchange messages with other users, including during electronic transactions. For example, when two or more users conduct a transaction together, an online transaction processor may be utilized to process payments between the users where the users may add a message or other content to describe the payment or alert another user of the intent for the payment. However, when messaging between users, the users may utilize the service provider for illicit or illegal purposes, including transmission of malicious material, purchase of drugs or weapons, or otherwise performing noncompliant actions or actions the service provider does not want performed through its platform. In order to hide these noncompliant uses of the service provider, the users may utilize coded messages, such as those containing symbols, emojis, emoticons, or other graphical images that convey the message but are not immediately apparent to compliance systems of the service provider that process messages and provide automated alerts to compliance administrators and systems. Thus, the service provider may be unaware of the illicit or illegal uses of the service provider's digital platform, which may be mandated by the automated compliance systems of the service provider.

BRIEF DESCRIPTION OF THE DRAWINGS

FIG. 2A is exemplary input of emojis and emoticons that are mapped to target keywords for use in determining message content, according to an embodiment;

Figure 1:
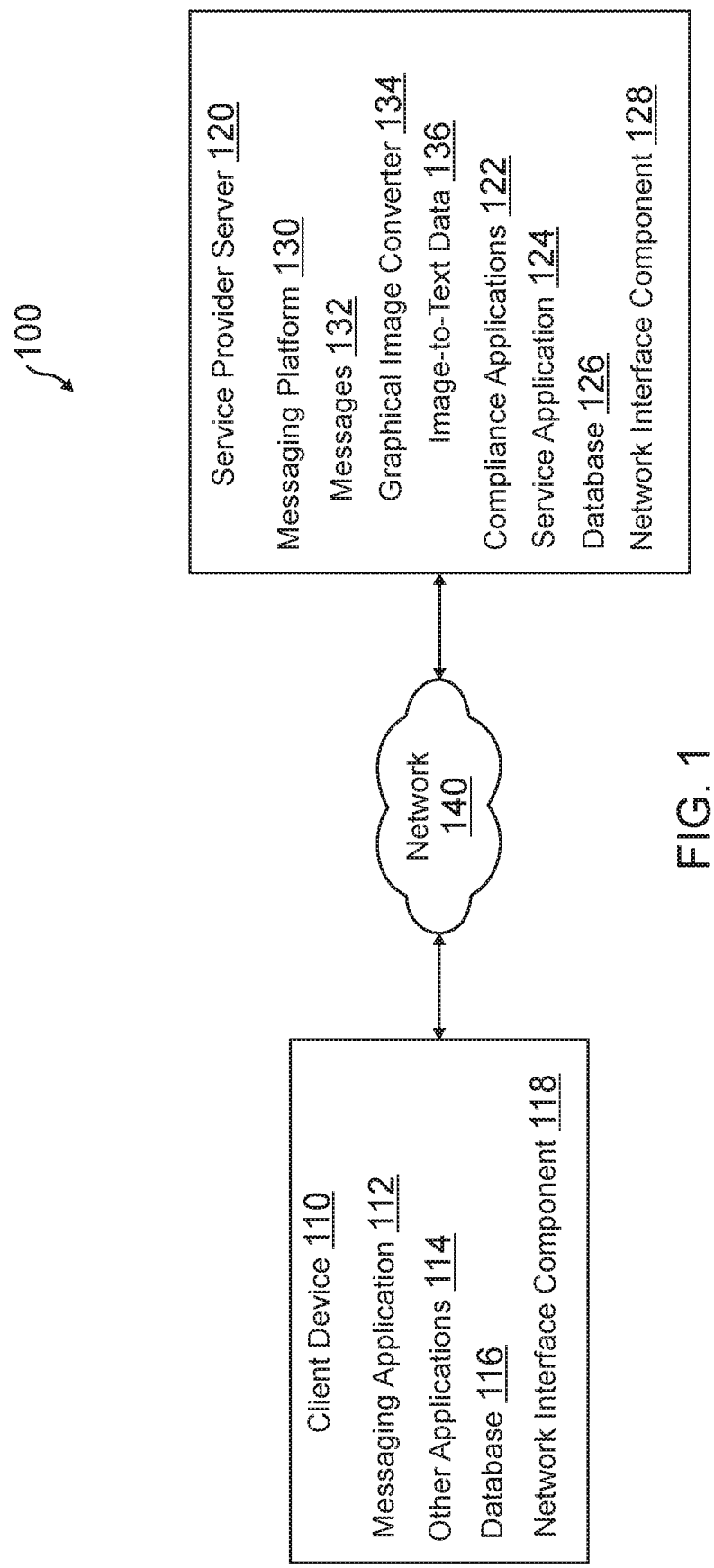
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for intelligent analysis of digital symbols for message content determination. Systems suitable for practicing methods of the present disclosure are also provided.

Users may utilize an online service provider to send and receive messages, such as via an online transaction processor, social networking platform, microblogging platform, media posting/sharing platform, or the like. When sending messages, users may provide message content that includes text, as well as symbols, emojis, emoticons, and other graphical images. These graphical images may correspond to a word or phrase that takes the place of some or all of the text within the message and has a corresponding meaning. Thus, the intent of the message may be adjusted by the graphical image(s) within the message. In order to determine the content of the message and the intent in sending the message or conveying an idea, meaning, or message to another user, the service provider may utilize an intelligent system for message content prediction and determination. The intelligent system may scan for and/or identify messages having the graphical images within the message, such as in a body, title, or other part of the message. This may be done across all messages or a subset of messages, such as those identified as possibly fraudulent, malicious, illicit, violating use agreements or guidelines, or illegal. For example, other content in the message (e.g., text, amount for a transaction between the users associated with the message, or the like) and/or the accounts/users sending the message (e.g., flagged accounts, cross-border accounts and interactions, and the like) may be used to identify the subset of messages to scan.

Once a message having a graphical image or other visual is identified, the service provider may execute an operation of a content determination module and/or operation to determine the content of the message, and thereafter provide the content to a compliance system that checks for noncompliant messaging and/or actions by the account(s). The graphical image is converted to one or more words that are mapped to the graphical image or a similar graphical image. The mappings between images and meanings (e.g., target keywords) may be performed by a machine learning (ML), neural network (NN), or another artificial intelligence (AI) system. Additionally, a system administrator and/or compliance end user (e.g., compliance officer of the service provider or other compliance system) may provide the mappings. Using the mappings, the graphical image may be replaced by the corresponding one or more target keywords for the graphical image, which may include alternative target keywords where the graphical image has multiple mappings. Thereafter, the message having the graphical image(s) replaced by the target keyword(s) may be provided to a compliance system for determining adherence to compliance rules and prevention of noncompliant activities and actions by the user(s) with the service provider. This may include one or more actions that may be executed as remediation to the potentially noncompliant activity for the message and/or account.

For example, a user may wish to process a purchase of an item via a digital account and/or payment card that provides values, credit, or other funds to the user through an online transaction processor and/or electronic card network. Selection of one or more items for an in-person transaction at a physical merchant location or via an online marketplace or other digital platform may require a payment instrument from the user for electronic transaction processing. A user may pay for one or more transactions using a digital wallet or other account with an online service provider or other transaction processor (e.g., PayPal®). An account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions after identity confirmation. However, in other embodiments, the account creation may be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

In order to pay for the transaction (e.g., a transfer or payment to another user, merchant, or other entity), the user may login to or otherwise utilize the account with the service provider through authentication information, and request processing the transaction using the account. A payment may then be issued to the other party to the transaction and transaction information may be stored with the digital wallet or account. In this regard, a digital token or other data may authorize and/or authenticate the user for their digital wallet use and/or a payment instrument in the digital wallet, which may be transmitted to another party (e.g., the merchant) for payment processing. In some embodiments, the account and/or digital wallet may be linked to the user's device or application and a one-touch checkout process may be authorized by the user, where selection of the account or other data may automatically initiate the process to provide a payment. Moreover, when the account is used, such as to process a payment, the online service provider may allow for messaging, which may be between two or more users, through a data feed, in an electronic post, or the like. However, other types of messaging may also be provided by the service provider, such as instant messaging, email, social networking feeds and posts, and the like, such as by a social network, micro-blog, media sharing platform, messenger, etc.

Thus, the messages sent or posted by users may include various content, which may take the form of text and/or graphical images (e.g., emojis, emoticons, symbols, art or images made from symbols or alphanumeric input, and the like). These graphical images may have different meanings, which may also be based on the context in which the graphical images are sent (e.g., based on the additional text, location, nationality, demographic, time, age, user, etc. in or associated with the message). Thus, a content determination system of an image processing module for the service provider may include a graphical image conversion operation to convert the graphical image to one or more corresponding target keywords. This may be done based on a mapping of different graphical images (e.g., emojis, emoticons, symbols, images, etc.) to the corresponding keyword(s). Each graphical image may have one or more corresponding meanings. For example, an emoji picturing a pill may have an associated meaning of "drugs." The graphical image may have multiple meanings as well, such as the pill emoji also meaning "medicine" and/or "sick." The image-to-text mapping for the graphical images may be generated, and the target keyword(s) assigned to the graphical image(s), by a system administrator and/or end user for the graphical image conversion operation, which may link and create the mappings based on the target keywords (e.g., assigning one or more target keywords to the graphical image based on one or more meanings of the graphical image). The target keywords may correspond to a sequence of characters, including words and phrases, and may also be based on a character sequence of the message.

In further embodiments, the graphical image conversion operation may further convert one or more graphical images to one or more target keywords using a machine learning (ML), neural network (NN), or another artificial intelligence (AI) model. For example, the AI model may be trained for image conversion using training data, which may allow for the model to be implemented in an AI system to perform automatic image conversion of one or more target keywords. The training data may include one or more graphical images and their corresponding keywords. The training data may correspond to annotated training data having the graphical images annotated with the corresponding keywords for the graphical images based on their meaning, such as the mapping performed by the system administrator/user of the graphical images to the target keywords used for image-to-text conversions. An AI algorithm and technique may be used to convert the graphical images to vectors, which are associated with the corresponding target keywords. The vector may be of a certain length depending on the features of the training data and the corresponding classifiers (e.g., target keywords) for the training data and AI model. This may also include training based on the character sequence of the target keywords. Thus, as further graphical images are received by the trained AI model, those graphical images may be converted to a vector and compared to other same or similar vectors in order to determine a decision, classifier, and/or corresponding value and output by the AI model. Exemplary AI training algorithms and/or techniques may be performed using a convolutional neural network (CNN), pixel level ML, or another deep neural network (DNN), however, other AI systems for pattern recognition may also be used. Additionally, the AI model may utilize supervised training where the system administrator or other end user may provide feedback and designations of whether the graphical images are properly mapped to the corresponding keywords. However, unsupervised learning may also be utilized based on the type of AI algorithm used to training the AI model.

Each graphical image may be assigned one or more target keywords based on the AI model and/or image-to-text mapping of the graphical images and target keywords. The image to text mapping may be utilized in conjunction with the AI model, or each may be used separately. For example, when the graphical image conversion operation is implemented for the image processing system, the system administrator or other user may generate and provide the imageto-text mapping prior to an AI model being trained. Thereafter, using the mapping, as well as additional graphical images received by the image processing system and corresponding target keywords, the image processing system may train the AI model for conversion of graphical images to target keywords. This may be done over time and the AI model may be required to reach a target or threshold accuracy rate prior to implementation and use of the AI model. The mapping and/or AI model may therefore be implemented with the image processing system for the graphical image conversion operation. The image processing system may then receive, listen for, and/or identify one or more digital electronic messages sent using the communication platform(s) of the service provider. The image processing system may identify the messages having one or more graphical images, which may then be processed by the system Once a message is detected that has one or more graphical images requiring conversion to determine the content of the message, which may be used to determine if the intent, use, or meaning of the message includes fraudulent, malicious, illicit, or illegal material. For example, the graphical image may be replaced by the corresponding one or more target keywords by the graphical image conversion operation. The target keywords may be selected as a word or phrase for the graphical image that replaces the graphical image based on the meaning of the graphical image. Further, multiple words or phrases may also be utilized in place of the graphical image, such as based on alternative meanings of the graphical image (e.g., weapon, gun, shoot, hunt, target, cowboy, sharpshooter, accurate, etc. for a gun emoji or image). The selection of the target keywords may be based on the context of the message, including additional text, location, nationality, demographic, time, age, user, etc. in the message or associated with the message. For example, the target keyword may also consider the additional text in the message and/or surrounding the graphical image. In this regard, a graphical image of a gun may mean "gun" or "weapon" when utilized in a message that include "I want to buy a (gun emoji)." However, in a message that states, "We should go (gun emoji) (animal emoji) soon," the gun emoji may instead mean "hunting." When replacing the graphical image with one or more words or phrases based on the target keyword(s), the text within the message may be constructed having the target keyword(s) in place of the graphical image(s). Thus, the sentences and other content in the message may be reconstructed as plain text data for analysis. Where one or multiple different words or phrases are selected based on alternative meanings of the graphical image, multiple different plain text data may be generated for the message.

This conversion and replacement of the graphical images may be done through conversion using the image-to-text mapping wherein graphical images are mapped to target keywords. The graphical image may be compared to the images in the mapping, and a corresponding graphical image may be identified, which allows for lookup of the target keyword(s). Additionally, when determining the target keyword(s) through the AI model, the graphical image may be converted to a vector of a length depending on the features of the graphical image and training data. Thereafter, a classifier (e.g., a target keyword or other value that allows determination of the target keyword) may be determined through comparison of the vector converted from the graphical image to other vectors determined from graphical images in the training data. A closest one or more vectors may be identified for classification and may be required to meet or exceed a threshold comparison value or likeness. Thereafter, a compliance system may be used with the plain text to determine whether the message includes fraudulent, illegal, illicit, malicious, or otherwise noncompliant content, including content that violates or otherwise does not comply with use restrictions or guidelines associated with the system, which may be set by the system or mandated by local, state, national, or international regulations.

For example, the compliance system may analyze the plain text of the message to determine a sentiment and/or intent of the content within the message. The compliance system may also analyze the entire message as well to determine if the message is noncompliant. For example, with a message that states, "I need to take my (pill emoji)," the compliance system may receive "medicine" and "drugs." However, in such a sentence, the content likely indicates the message states, "I need to take my medicine," which would be compliant with the service provider. However, "I want to buy some (pill emoji)," instead would likely mean, "I want to buy some drugs," which would be noncompliant. Further, additional text, location, nationality, demographic, time, age, user, etc., may also be used to determine the sentiment and intent of the message. For example, where the user may be at a water park or pool, stating "Where is my (gun emoji)?" may indicate a water gun and therefore likely be compliant with the service provider, whereas the same sentence in more restricted environments (e.g., work, school, etc.) may indicate a threat and therefore be noncompliant. Thus, examining the entire message may reduce false positives in identifying noncompliant messages and content. After feeding the message having the converted graphical image(s) to the compliance system, a compliance determination may be made. If the message is compliant, then no action may be taken.

However, where the message is not compliant with the compliance system and rules of the service provider, the compliance system may determine one or more remedial actions to take in order to prevent the noncompliant message and content and/or alert an authority of the noncompliant message. For example, the compliance system may transmit a notification to an administrator or otherwise provide a report to an authoritative entity. The action and notification may be automated and performed automatically without user input. For example, a notification may be automatically transmitted to an authority so that a compliance officer or administrator is not required to manually perform review and such flagging/notifying. However, in other embodiments, the notification may be provided to the compliance administrator in order for the compliance administrator to determine whether the message is actually noncompliant or whether the message is a false positive from the automated system. In such a manner, the ML model and/or mapping may be further trained or revised in order to reduce such false positives and better correlate graphical images to corresponding target keywords.

Further, the action may include barring the account, preventing a payment or other activity associated with the message, preventing transmission of the message, alerting an authority (e.g., local law enforcement or the like), and/or alerting one or more users in the communication chain of the noncompliant content. Thereafter, one or more updates to the image processing system and graphical image conversion operation may be performed based on the results of the compliance check. For example, additional mappings may be made of further graphical images to one or more target keywords, including additional meanings of graphical images, may be generated from the graphical image conversion and/or compliance check of the content. Further, the AI model may be further trained and/or retrained based on the graphical image conversions and additional graphical images mapped or defined as keywords.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client device 110 and a service provider server 120 in communication over a network 140. Client device 110 may be used to transmit a message via a platform provided by service provider server 120. The message may include content, where the content may have one or more graphical images transmitted with the message. The graphical image(s) may have a corresponding meaning based on one or more target keywords for the graphical image(s). Thereafter, service provider server 120 may determine the content in plain text by converting the graphical image(s) using an image processing module having a graphical image conversion operation. This allows for analysis of the message content to determine if the message is noncompliant with a compliance system of service provider server 120, such as if the message is being used for fraudulent, malicious, illegal, or illicit means.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented using any appropriate hardware and software configured for wired and/or wireless communication with service provider server 120 and/or another device or server, for example, to transmit messages. Client device 110 may also be used for processing payments and transfers with another user, device, and/or server, which may be associated with the transmitted messages. Client device 110 may correspond to an individual user, consumer, or merchant, or group of such entities, that transmit messages having content. In various embodiments, client device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Client device 110 of FIG. 1 contains a messaging application 112, other applications 114, a database 116, and a network interface component 118. Messaging application 112 and other applications 114 may correspond to executable processes, procedures, and/or applications with associated hardware. In other embodiments, client device 110 may include additional or different software as required.

Messaging application 112 may correspond to one or more processes to execute modules and associated devices of client device 110 to provide a convenient interface to permit a user for client device 110 to enter, view, and/or transmit messages between other users and/or groups of users, for example, using a communication and/or messaging platform of service provider server 120. In this regard, messaging application 112 may correspond to specialized hardware and/or software utilized by client device 110 to allow a user to enter and/or select text and graphical images (e.g., emoji, emoticon, symbols or alphanumeric art or images, visual images, and the like), which may be used to form a message. For example, a user interface may present a message field, including a header, title, body, footer, signature block or area, and the like, where a user may enter data for a message to be transmitted to another user. The message may therefore include content that is to be viewed by another user that is entered by the user. Such content may include graphical images in the place of words or phrases, which may be used to convey an understood meaning. For example, a smiley emoji may be used to convey happiness, or may be having a target keyword as a meaning, such as "smile" or "happy." The graphical images may therefore be used in the place of target keywords in the content. Messaging application 112 may also be used to receive and view messages from other users, including those having graphical images in place of one or more words or phrases. Such messages transmitted from and/or received by messaging application may be analyzed by service provider server 120 to convert the graphical images to target keywords in order to determine whether the message is compliant or not with a compliance system having one or more compliance rules.

In various embodiments, messaging application 112 may provide transaction processing for the items, such as through a user interface enabling the user to enter and/or view the items that the user associated with client device 110 wishes to purchase. Messaging application 112 may also be used by a user to provide payments and transfers to another user or group of users, which may include associated messages describing the transaction, payment, or transfer. For example, messaging application 112 may utilize user financial information, such as credit card data, bank account data, or other funding source data, as a payment instrument when providing payment information. Additionally, messaging application 112 may utilize a digital wallet associated with an account with a payment provider as the payment instrument, for example, through accessing a digital wallet or account of a user through entry of authentication credentials and/or by providing a data token that allows for processing using the account. Thereafter, when processing a transaction or sending a payment/transfer, the user of client device 110 may also add a message or transmit a follow-up or related message. Messaging application 112 may be used for input of the messages, as well as viewing of received messages associated with a payment or transaction. Such digital electronic messages may include graphical images entered by the user or transmitted by another user in place of words or phrases, for example, based on an understood meaning of the graphical images.

In various embodiments, messaging application 112 may correspond to a general browser application configured to retrieve, present, and communicate information over the Internet (e.g., utilize resources on the World Wide Web) or a private network. For example, messaging application 112 may provide a web browser, which may send and receive information over network 140, including retrieving website information, presenting the website information to the user, and/or communicating information to the website, including messages and/or transaction and payment information transmitted between different parties and entities. However, in other embodiments, messaging application 112 may include a dedicated application of service provider server 120 or other entity (e.g., a merchant), which may be configured to assist in transmitting messages and processing transactions electronically, such as a peer-to-peer payment application associated with a peer-to-peer messaging and payments. Such application may provide instant messaging, email, SMS/MMS messaging, social networking posts and data feeds, microblogging, media sharing, and the like for transmitting messages.

In various embodiments, client device 110 includes other applications 114 as may be desired in particular embodiments to provide features to client device 110. For example, other applications 114 may include security applications for implementing client-side security features, programmatic client applications for interfacing with appropriate application programming interfaces (APIs) over network 140, or other types of applications. Other applications 114 may also include email, texting, voice and IM applications that allow a user to send and receive emails, calls, texts, and other notifications through network 140. Other applications 114 may also include other location detection applications, which may be used to determine a location for client device 110, such as a mapping application. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of client device 110, such as display components capable of displaying information to users and other output components, including speakers.

Client device 110 may further include database 116 which may include, for example, identifiers such as operating system registry entries, cookies associated with messaging application 112 and/or other applications 114, identifiers associated with hardware of client device 110, or other appropriate identifiers. Identifiers in database 116 may be used by a payment/service provider to associate client device 110 with a particular account maintained by the payment/service provider. Database 116 may also further store received transaction data, as well messages transmitted to or from client device 110. Additional data used to determine one or more target keywords from a graphical image, as well the context, intent, or sentiment of the message, may also be stored by database 116, which may include such data detected by other applications 114.

Client device 110 includes at least one network interface component 118 adapted to communicate with service provider server 120 over network 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide account services for electronic messaging between users and other entities, as well as electronic transaction processing and payment through an online digital platform and mobile applications. In this regard, service provider server 120 includes one or more processing applications which may be configured to interact with client device 110 and/or another device/server to facilitate communications and transactions between users. Service provider server 120 may be maintained by or include another type of platform or service provider, for example, a transaction processor such as PAYPAL®, Inc. of San Jose, Calif., USA.

Service provider server 120 of FIG. 1 includes a messaging platform 130, compliance applications 122, a service application 124, a database 126, and a network interface component 128. Service application 124, and other applications may correspond to executable processes, procedures, and/or applications with associated hardware. In other embodiments, service provider server 120 may include additional or different modules having specialized hardware and/or software as required.

Messaging platform 130 may correspond to one or more processes to execute modules and associated specialized hardware of service provider server 120 to generate and transmit messages between different entities, parties, and/or users. In this regard, messaging platform 130 may correspond to specialized hardware and/or software used by a user to transmit a message to another user, entity, or the like, such as a merchant. Messaging platform 130 may correspond to a social networking platform, microblogging platform, media posting/sharing platform, or the like, which may be used in combination with service application 124 to provide messaging between parties (e.g., during a transaction or payment). Messaging platform 130 may therefore be used to transmit messages 132 via instant messaging, email, SMS/MMS messaging, social networking posts and data feeds, microblogging, media sharing, and the like. In this regard, messages 132 may correspond to digital messages electronically transmitted and including text content within a field of the message (e.g., a title, body, header/footer, signature block, etc.), as well as graphical images used in place of one or more words for the graphical images corresponding meanings.

For example, client device 110 may be used to access messaging platform 130 and construct one or more of messages 132. When providing input to construct, generate, and transmit messages 132, the input may include alphanumeric characters, symbols, and the like. Further, graphical images may be generated using the alphanumeric characters and/or symbols, as well as other images including emojis, emoticons, visual images, and the like. Messages 132 may then be transmitted between two or more parties utilising computing devices, such as client device 110. However, one or more of messages 132 may have noncompliant content, such as content that violates a compliance rule established to prevent fraudulent, malicious, illegal, or illicit content and use of the services provided by service provider server 120 (e.g., messaging and electronic transaction processing services). Thus, messages 132 may be required to be analyzed by compliance applications 122 to determine if any of messages 132 are noncompliant when being sent and received via messaging platform 130. Compliance applications 122 may require plain text in order to analyze messages 132 and determine whether content in messages 132 is noncompliant. When messages 132 include graphical images in place of words or phrases, compliance applications 122 may be unable to determine whether one or more of messages 132 are noncompliant, as the content is not in plain text for analysis of the content and corresponding sentiment or intent.

Thus, messaging platform 130 further includes a graphical image converter 134, which may correspond to an operation of an image processing module and system. Graphical image converter 134 allows for conversion of graphical images to one or more target keywords that correspond to the associated meaning of the graphical images. Graphical image converter 134 includes image-to-text data 136, which may be used to convert graphical images in messages 132 into corresponding target keywords (e.g., one or more words or phrases) so that plain text within messages 132 may be analyzed by compliance application 122. In this regard, image-to-text data 136 may include a mapping of one or more graphical images to one or more target keywords, which may be used to perform a lookup of a graphical image to the corresponding target keyword(s). This mapping may be established by a system administrator or other end user that may designate the target keyword(s) for the graphical image(s) based on an understood meaning of the graphical image(s).

In further embodiments, image-to-text data 136 may be used with an AI model, such as a ML or NN model, trained to convert graphical images to corresponding target keywords, such as based on a vectorization of the corresponding graphical image and comparison to vectors for other graphical images. The training data may include annotated training data of graphical images to target keywords, such as the mapping of the graphical image(s) to target keyword(s). The training data may be used to generate one or more classifiers and provide recommendation, predictions, or other outputs based on those classifications and the trained AI model. For example, image-to-text data 136 may be used to generate one or more layers of an AI model, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output values or classifications through training data that annotates graphical images with target keywords. Thus, each node may correspond to a mathematical relationship or representation that assists in converting graphical images to target keywords and text. Within the input layer, each node may correspond to a distinct attribute or input data type that is used to train the AI model of image-to-text data 136.

Thereafter, the hidden layer may be trained with these attributes and corresponding weights using an AI algorithm, computation, and/or technique. For example, each of the nodes in the hidden layer generates a representation, which may include a mathematical AI computation (or algorithm) that produces a value based on the input values of the input nodes. The AI algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the AI model of image-to-text data 136 that attempt to convert graphical images to target keywords. Thus, when image-to-text data 136 is used to perform a predictive analysis and output corresponding to one or more target keywords for an input graphical image, the input may provide a corresponding output based on the classifications trained for the AI model of image-to-text data 136.

The AI model of image-to-text data 136 may be trained by using training data corresponding to mapping graphical images to target keywords. By providing training data to the AI model, the nodes in the hidden layer may be trained (adjusted) such that an optimal output (e.g., a classification) is produced in the output layer based on the training data. By continuously providing different sets of training data and penalizing the AI model of image-to-text data 136 when the output of the AI model is incorrect, the AI model of image-to-text data 136 (and specifically, the representations of the nodes in the hidden layer) may be trained (adjusted) to improve its performance in data classification. Adjusting the AI model of image-to-text data 136 may include adjusting the weights associated with each node in the hidden layer. Graphical image converter 134 may further analyze the message content holistically, such as in context of the message and/or the additional content in the message (as well as location, nationality, demographic, time, age, user, etc. in or associated with the message), to determine the target keyword(s) for a graphical image. Once the target keyword(s) for a graphical image in one or messages 132 are determined, the target keyword(s) may be replace in content of the corresponding message so that plain text may then be analyzed. Thereafter, the plain text may be provided to compliance application 122 for analysis.

Compliance applications 122 may correspond to one or more processes to execute modules and associated specialized hardware of service provider server 120 to determine whether a message is compliant with one or more compliance rules established for service provider server 120, for example, to prevent fraudulent, malicious, illegal, illicit, or otherwise noncompliant activities on and uses of service provider server 120. In this regard, compliance applications 122 may correspond to specialized hardware and/or software to enforce these compliance rules once the compliance rules are received and established. Compliance applications 122 may analyze content of a message, such as plain text of the message from converted graphical images in the message, to determine if the message is compliant with the compliance rules. Analysis of the message for compliance may also take into account additional text, location, nationality, demographic, time, age, user, etc. in or associated with the message. If the message is compliant, no action may be taken. However, if the message is not compliant, a notification or alert may be generated, or another action may be taken including barring the account, preventing a payment or other activity associated with the message, preventing transmission of the message, alerting an authority (e.g., local law enforcement or the like), etc.

Service application 124 may correspond to one or more processes to execute modules and associated specialized hardware of service provider server 120 to provide a service to a user, including processing a transaction for item(s) with client device 110 130. In this regard, service application 124 may correspond to specialized hardware and/or software used by a user associated with client device 110 to establish an account with service application 124 by providing personal and/or financial information to service provider server 120 and selecting authentication credentials. The account may be used to purchase items and/or transfer funds, for example, through a peer-to-peer network and/or social networking environment that allows for interactions between different users, merchants, or other entities. The payment account may be accessed and/or used through a browser application and/or dedicated payment application executed by client device 110, such as messaging application 112. However, in other embodiments, a payment account may be generated by another online transaction processor or service provider and linked with service provider server 120.

Service application 124 may process a payment and may provide a transaction history for transaction authorization, approval, or denial. Thus, service application 124 may correspond to a product of service provider server 120 that may be utilized by end users, such as to perform electronic payments, transfers, and the like using one or more accounts and/or financial instruments. Service application 124 may also include or utilize different processors, engines, or models as required for an authentication, account setup and maintenance, electronic transaction processing, deposit and/or withdrawal, dispute resolution, and the like. However, in other embodiments, service application 124 may correspond to other types of services for use with messaging platform 130, such as social networking, microblogging, email, forum posting, media sharing, shopping and merchant marketplace, and the like, which may provide other services to users when utilising messaging platform 130.

Additionally, service provider server 120 includes database 126. Database 126 may store various identifiers associated with client device 110. Database 126 may also store account data, including payment instruments and authentication credentials, as well as transaction processing histories and data for processed transactions. Database 126 may store received data associated with a user for messaging other users, such as account information and messages 132. This may include plain text for messages 132 converted from graphical images. Moreover, data necessary to convert graphical images may be stored by database 126, such as image-to-text data 136 and any associated operations and data.

In various embodiments, service provider server 120 includes at least one network interface component 128 adapted to communicate client device 110 and/or another device/server for a merchant over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

FIG. 2A is exemplary input 200a of emojis and emoticons that are mapped to target keywords for use in determining message content, according to an embodiment. Input 200a of FIG. 2A displays different messages that may be transmitted and analyzed for compliance, for example, by service provider server 120 discussed in reference to system 100 of FIG. 1.

In this regard, input 200a includes emojis 202 and emoticons 204 that may be found in messages and may be converted to target keywords in order to analyze plain text of the messages. This may include determination of an intent and/or sentiment of the messages in order to detect noncompliant messages and activities on a service provider platform. For example, with emojis 202, input data 206 is matched to target data 208. Emojis 202 may correspond to graphical images that may be entered to a message by a user in place of text, such as a word or a phrase as part of content in the message. In input data 206, a gun emoji 210 is shown with the word "shipment," which may be converted to "gun shipment" in plain text as target data 208. Similarly, a pill emoji 212 is shown with the word "deal," where pill emoji 212 may be converted to "drug" as the target keyword in target data 208, thereby creating a plain text message stating "drug deal." Such messages may be converted from the graphical images of emojis 202, and thereafter provided to a compliance system for determination of whether the messages comply with the compliance rules of the service provider. In such cases, target data 208 may be determined to be noncompliant and flagged, such as if illegal, illicit, or dangerous.

Determination of target data 208, such as conversion of gun emoji 210 and/or pill emoji 212 may further be based on additional text, or other parameters (e.g., location, nationality, demographic, time, age, user, etc.) in or associated with the message. For example, gun emoji 210 with the word "shipment" may be converted to "gun shipment," however, gun emoji 210 with the words "video game," may instead convert to "shooter video game" (e.g., a first-person shooter video game between friends). Similarly, pill emoji 212 with "deal" may signify "drug" for pill emoji 212. However, pill emoji 212 with "headache" may signify that pill emoji 212 should be converted to "medicine" for a message stating "headache medicine." Thus, the context of the message may change the corresponding target keywords for emojis 202. However, with emojis 202 having multiple meanings and target keywords, each different meaning and target keywords may be used and provided to a compliance system for checking each of the different messages and content for target data 208.

Further, when a message having one or more graphical icons in the message, such as one or more of emojis 202 or emoticons 204, is determined to be compliant, a service provider may instead execute another operation. For example, when gun emoji 210 is determined to be associated with a water gun, and the corresponding user/mobile device is at or nearby a pool or waterpark, the service provider may provide one or more options to purchase water guns nearby the user's current geo-location (e.g., as detected through the user's mobile device). Similarly, where the pill emoji 212 may be associated with headache medicine, a nearby pharmacy may be determined and provided to the user sending or receiving the message. In further embodiments, the service provider may further or instead provide additional information based on the compliant messages, such as social networking links, searches and search results, driving directions, media content (e.g., instructional videos, television shows or movies, and the like), and other data may be provided to the user sending and/or receiving the message.

In emoticons 204, input data 214 is converted to target data 216, which allows for analysis by the service provider's compliance system. For example, in input data 214, a Cuba emoticon is shown as a styled use of different alphanumeric characters and/or symbols, which allows for conversion to the word "Cuba" based on the sequence of characters and/or symbols in target data 216. Similarly, a bomb emoticon 220 with the word "making" may be converted to target data 216 that displays the message as "bomb making." This similarly is performed based on the sequence of characters, such as a dot, bullet point, or period follows by a tilde symbol and an asterisk. With a smoking emoticon 222 in input data 214, multiple different target keywords are mapped to smoking emoticon 222 in target data 216 based on the sequence of characters and/or symbols. This includes "smoking," "cigarette," and/or "Cuban cigar" for smoking emoticon 222. Lastly, an animal emoticon 224 with "leather" may be converted to "animal leather" in target data 216. Similar to emojis 202, emoticons 204 may be converted from the graphical images into target data 216 based on the additional text or other parameters in the message, such as by changing a meaning and/or target keyword for emoticons 204 based on the context of the message.

Figure 2B:
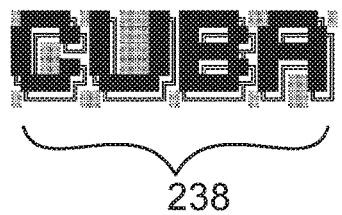
FIG. 2B is exemplary input of symbols and other graphical images that are mapped to target keywords for use in determining message content, according to an embodiment.
Figure 2B:
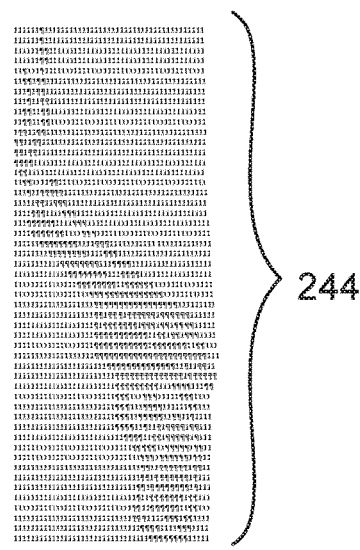

FIG. 2B is exemplary input 200b of symbols and other graphical images that are mapped to target keywords for use in determining message content, according to an embodiment. Input 200b of FIG. 2B displays the different messages that may be transmitted and analyzed for compliance, for example, by service provider server 120 discussed in reference to system 100 of FIG. 1.

In this regard, input 200b includes image 230 and symbols 232 that may correspond to graphical images for conversion to target keywords in order to identify noncompliant messages and activities with a service provider. Image 230 is shown with input data 234 and target data 236 converted from input data 234. For example, image 230 includes a Cuba image or graphical art that displays the word "Cuba" in an image, such as a file, visual image, or the like. Cuba image 238 may be converted to target data 236 showing "Cuba" as the conversion using image matching and/or image processing through a mapping and/or a trained AI system for converting Cuba image 238. Thus, when Cuba image 238 is used in a message, plain text for Cuba image 238 may replace Cuba image 238 with the word "Cuba." This allows for plain text analysis of the corresponding message.

Symbols 232 include input data 240 and target data 242 converted from input data 240. In this regard, Symbols 232 includes a gun symbol art 244, which is made out of multiple symbols (e.g., use of the @ symbol). Utilising a combination and/or layout of the symbols, an idea or other graphical image may be displayed and conveyed to another user. Thus, the layout and sequence of the symbols in gun symbol art 244 may be used to represent an idea, meaning, word, and/or phrase. Thereafter, a graphical image conversion operation may convert gun symbol art 244 to target data 242, shown as "gun." Thus, when a message includes gun symbol art 244, plain text may be converted from gun symbol art 244 and replaced in the message so that the message may be analyzed for compliance with compliance rules of a service provider. Similar to emojis 202 and emoticons 204, image 230 and symbols 232 may be converted from the graphical images into target data 236 and 242, respectively, based on the additional text or other parameters in the message, such as by changing a meaning and/or target keyword for image 230 and/or symbols 232 based on the context of the message.

Figure 3:
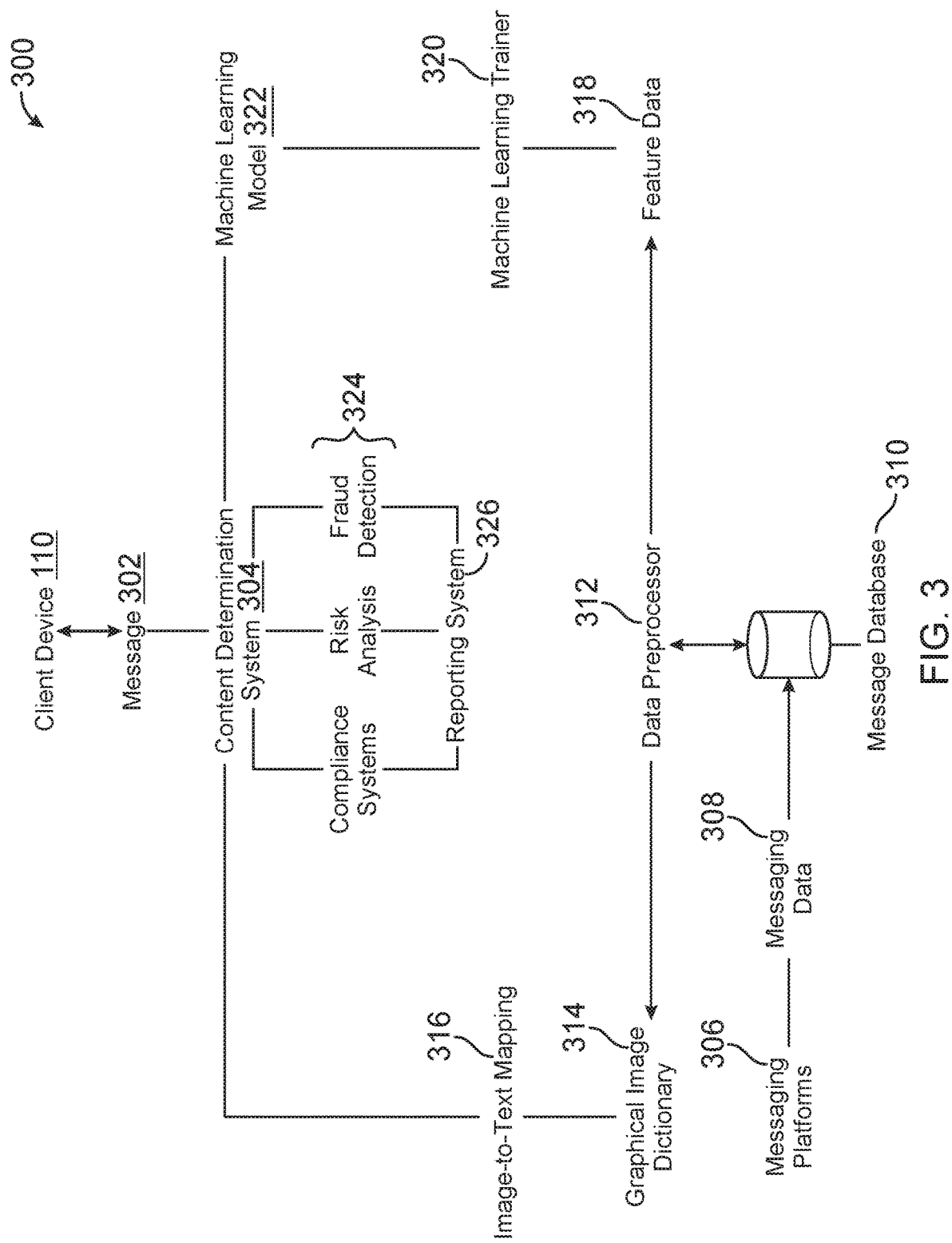
FIG. 3 is an exemplary environment with a system for analysis of digital symbols and graphical images to determine message content, according to an embodiment.

FIG. 3 is an exemplary environment 300 with a system for analysis of digital symbols and graphical images to determine message content, according to an embodiment. Environment 300 of FIG. 3 includes client device 110 discussed in reference to system 100 of FIG. 1. In this regard, client device 110 provides a message for analysis by a service provider, such as service provider server 120 in system 100, for compliance with one or more compliance rules.

Environment 300 includes client device 110 that may transmit a message 302 using a messaging platform, such as one provided by service provider server 120. Message 302 may include some content, such as text content and graphical images, including emojis, emoticons, alphanumeric and/or symbol art, visual images, and the like. In order to ensure that message 302 is not providing noncompliant content and/or using the messaging platform in a noncompliant manner (e.g., for fraudulent, malicious, illegal, or illicit activities), a content determination system 304 may be implemented to convert any graphical images to text, such as one or more corresponding keywords. Content determination system 304 may include different data, modules, and/or operations, such as AI models and/or a graphical image conversion mapping. In this regard, in order to provide this data, messaging platforms 306 may collect messaging data 308 in a message database 310.

Messaging platforms 306 may correspond to one or more platforms used to transmit messages between users, and may include internal and/or external platforms of the corresponding service provider (e.g., service provider server 120). Thus, messaging data 308 may include messages sent between users that includes graphical images. Messaging data 308 is then stored in message database 310 for analysis and determination of data necessary for conversion of graphical images to one or more target keywords. In various embodiments, messaging data 308 may include annotations and/or determinations that messages and content with messages (e.g., text and graphical images) are compliant or noncompliant with the compliance rules of the corresponding service provider or messaging platform used for the messages. Thus, messaging data 308 may be used to generate a mapping of graphical images and other message content to target keywords, as well as compliance status. For example, the messages may be analyzed and/or marked by one or more compliance officers or administrators to flag certain messages as noncompliant and/or designate other or certain messages as compliant.

Thereafter, a data preprocessor 312 may process messaging data 308 from message database 310, which may include generating a graphical image dictionary 314 based on input from an administrator. For example, an administrator may generate image-to-text mapping 316 for graphical image dictionary 314 by assigning and/or correlating one or more of the graphical images from messaging data 308 to one or more target keywords. In this regard, each graphical image may be assigned one or more target keywords based on an associated meaning or understood definition of the graphical image. This may be in a mapping that allows for lookup of a graphical image and conversion of the graphical image to the target keyword(s). Thereafter, image-to-text mapping 316 may be implemented in content determination system 304 for conversion of one or more graphical images in message 302.

In further embodiments, data preprocessor 312 may further or instead generate feature data 318 for training an AI model, such as a ML model and technique used to convert graphical images to one or more target keywords. Thus, feature data 318 may include features of graphical images and may be annotated with corresponding target keywords such that feature data 318 may be used by a machine learning trainer 320 to train a machine learning model 322. This may include vectorizing the features within feature data 318 so that corresponding classifications may be performed based on input graphical images. Once machine learning model 322 is trained, machine learning model 322 may be implemented with content determination system 304 for conversion of graphical images to target keywords.

Using image-to-text mapping 316 and/or machine learning model 322, one or more conversions of a graphical image to one or more target keywords may be performed by content determination system 304. This includes converting message 302 to plain text, which may then be analyzed using a compliance detection module 324. For example, compliance detection module 324 may include compliance systems, risk analysis, fraud detection, and the like, which may determine if message 302 is compliant with the rules and regulations of the service provider. If so, no action may be taken. However, if message 302 is determined to be non-compliant with the requirements of the service provider, message 302 in plain text and/or with the graphical images may be provided to a reporting system 326. Reporting system 326 may then determine whether a further action is required to be taken in order to resolve the noncompliance of message 302.

Figure 4A:
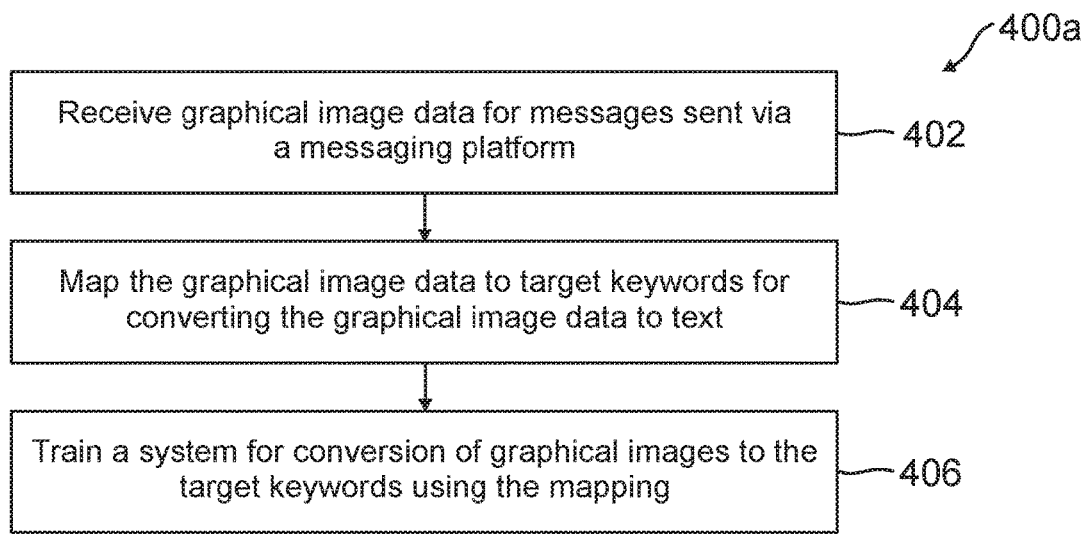
FIG. 4A is a flowchart of an exemplary process for training a system for intelligent analysis of digital symbols for message content determination, according to an embodiment.

FIG. 4A is a flowchart 400a of an exemplary process for training a system for intelligent analysis of digital symbols for message content determination, according to an embodiment. Note that one or more steps, processes, and methods described herein of flowchart 400a may be omitted, performed in a different sequence, or combined as desired or appropriate.

At step 402 of flowchart 400a, graphical image data for messages sent via a messaging platform is received. The graphical image data may include emojis, emoticons, alphanumeric and/or symbol images/art, or other visual content and images (including animated images), which may be included within messages. Thus, the graphical image data may further include message data for the messages having graphical images within the messages. Thereafter, using this graphical image data, the graphical images in the data are mapped to target keywords for converting the graphical image data to text, at step 404. This may include plain text that may be analyzed by a compliance system to prevent fraudulent, malicious, illegal, or illicit conduct. The mapping may be performed by an administrator that may annotate the graphical images based on a corresponding meaning for the graphical images in messages, which may also depend on the context and additional content in the message or associated with the message. At step 406, a system is trained for conversion of graphical images to the target keywords using the mapping. This system may include the mapping as a dictionary for lookup of corresponding target keywords. Further, the system may include a ML or other AI model trained to convert graphical images to text.

Figure 4B:
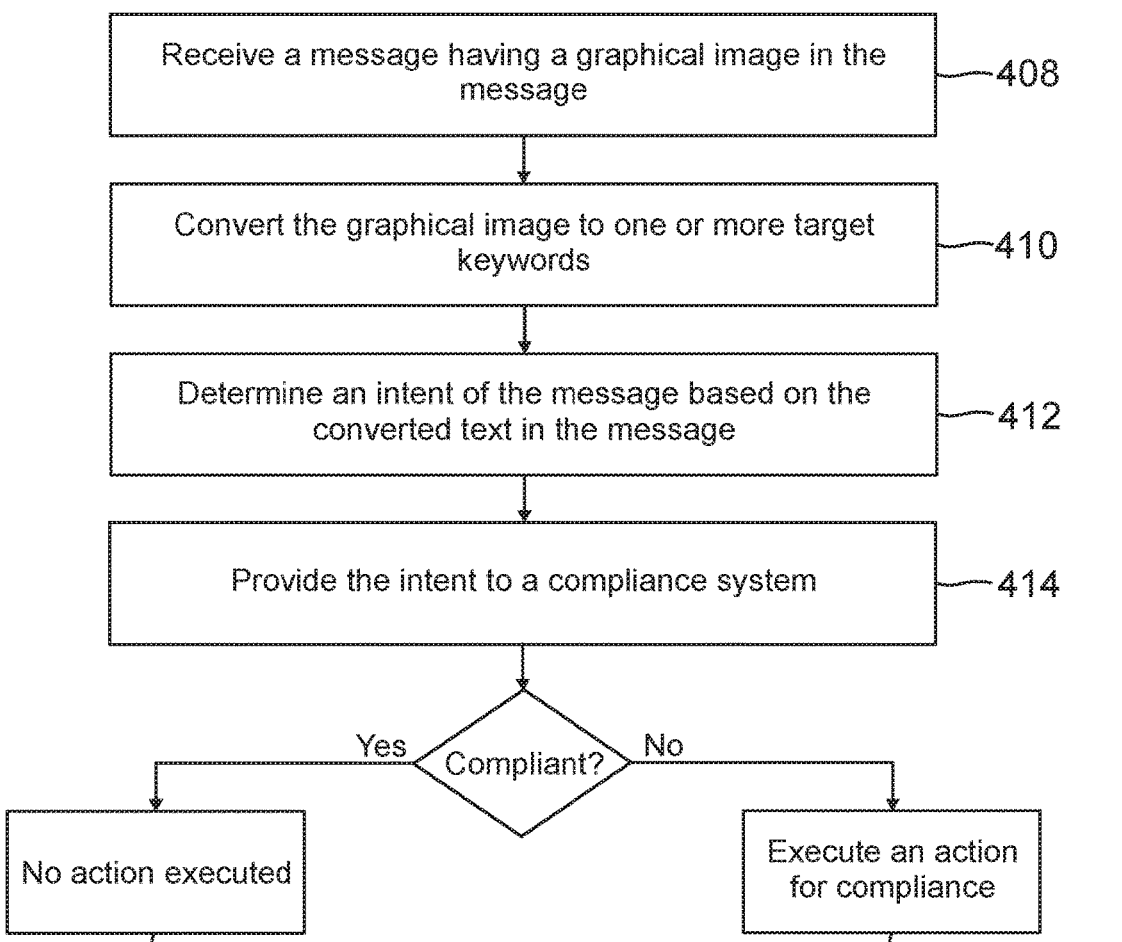
FIG. 4B is a flowchart of an exemplary process for utilising a system for intelligent analysis of digital symbols for message content determination, according to an embodiment.

FIG. 4B is a flowchart 400b of an exemplary process for utilising a system for intelligent analysis of digital symbols for message content determination, according to an embodiment. Note that one or more steps, processes, and methods described herein of flowchart 400b may be omitted, performed in a different sequence, or combined as desired or appropriate.

Once trained, the system receives a message having a graphical image in the message, at step 408 of flowchart 400b. The message includes one or more graphical images where conversion of the graphical images to text for the target keyword(s) in order to understand the content, intent, and/or sentiment of the message. At step 410, the graphical image is converted to one or more keywords using the system trained for conversion of the graphical images to target keywords. This may include all alternative target keywords so that one or more sentences, phrases, and/or other plain text may be generated and analyzed for compliance with the compliance rules of an online service provider.

The intent of the message is then determined based on the converted text in the message, such as the content of the message, at step 412. This may be performed by a compliance system or other intelligent text processor that is trained to understand if the message includes noncompliant content. For example, the intent may be associated with an intent or sentiment to perform an action, utilize a service, or other engage in some activity using the service provider. This intent is provided to the compliance system, at step 414, in order to analyze the intent and content of the message for noncompliant activities, such as fraudulent, malicious, illegal, or illicit electronic transaction processing using the service provider. However, other activities may be performed. If the intent is compliant with the compliance rules of the service provider, at step 416, no action is executed by the compliance system. However, if the intent is noncompliant, at step 418, an action is executed for compliance. This may include alerting or notifying a system administrator or other authority. Further, this may also including executing an action to prevent or rectify the noncompliant activity, such as by barring or reversing the activity, banning the account and/or user, or preventing/removing the noncompliant message.

Figure 5:
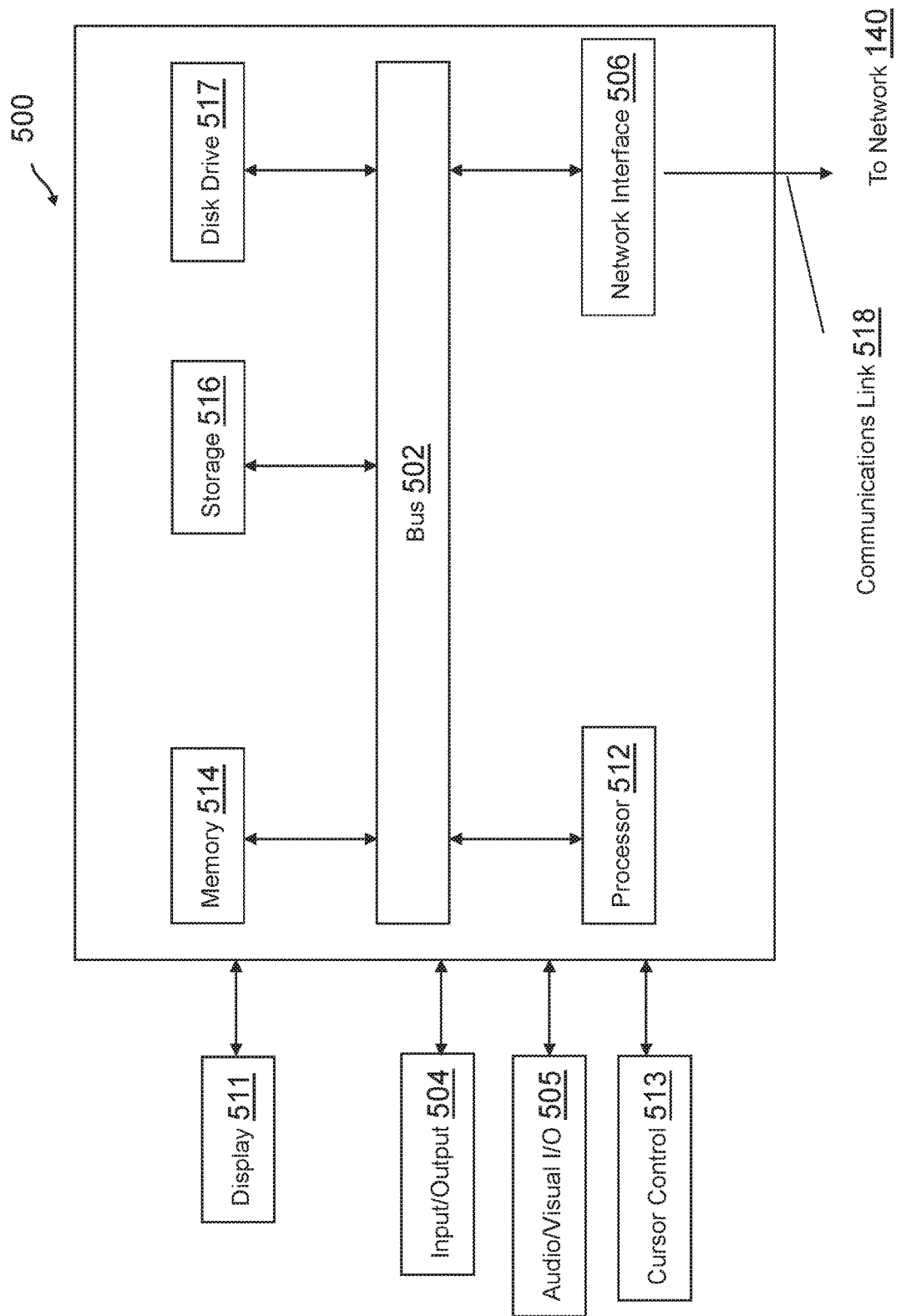
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
      receiving a digital message transmitted from an account of a user and comprising at least one of a plurality of characters or a plurality of symbols in the digital message;
      determining a graphical image from a sequence or a layout of at least a portion of the plurality of characters or the plurality of symbols in the digital message;
      accessing a graphical image conversion operation from an image processing module of the system, wherein the image processing module comprises a plurality of graphical images that are each associated with one or more of a plurality of target keywords for the graphical image conversion operation;
      converting the graphical image to a first target keyword of the plurality of target keywords using the graphical image conversion operation, the graphical image, and the sequence or the layout in the digital message;
      replacing the graphical image in the digital message with the first target keyword in plain text for the digital message;
      determining, using a compliance system, a message content of the digital message based at least on the digital message having the graphical image replaced by the first target keyword; and
      determining whether a compliance action is required to be executed with respect to at least one of the account of the user or the digital message based on the message content.

2. The system of claim 1, wherein the graphical image conversion operation utilizes image mapping data from the image processing module for the plurality of graphical images, wherein each of the plurality of graphical images is mapped to the one or more of the plurality of target keywords based on an associated meaning of each of the plurality of graphical images assigned to each of the plurality of graphical images in the image mapping data.

3. The system of claim 2, wherein prior to the receiving the digital message, the operations further comprise:
   receiving, by the image processing module from an image definition process used by one or more users associated with the system, a mapping table comprising each of the plurality of graphical images mapped to the one or more of the plurality of target keywords; and
   generating the image mapping data using the mapping table.

4. The system of claim 1, wherein the graphical image conversion operation comprises a conversion, using a machine learning model, of each of the plurality of graphical images to the one or more of the plurality of target keywords based on training data associated with the plurality of graphical images and the plurality of target keywords.

5. The system of claim 4, wherein prior to the receiving the digital message, the operations further comprise:
   training the machine learning model using the training data having the plurality of graphical images annotated using the plurality of target keywords.

6. The system of claim 4, wherein the converting the graphical image to the first target keyword comprises:
- determining a vector for the graphical image using the machine learning model, wherein the machine learning model uses one of a convolutional neural network (CNN), pixel level machine learning, or a deep neural network (DNN); and
- comparing the vector to a plurality of vectors associated with the plurality of graphical images annotated using the plurality of target keywords.

7. The system of claim 1, wherein the graphical image conversion operation comprises a conversion, using a machine learning model and image mapping data comprising image-to-text mappings in a mapping table for each of the plurality of graphical images mapped to the one or more of the plurality of target keywords, of each of the plurality of graphical images to the one or more of the plurality of target keywords.

8. The system of claim 1, wherein the message content comprises at least one of a context of the digital message or a sentiment of the digital message, wherein the message content indicates that the digital message violates a compliance policy of a service provider associated with the system.

9. The system of claim 1, wherein the digital message further comprises additional text in the digital message having the graphical image in place of a word or a phrase in the digital message, and wherein the determining the message content is further based on the digital message having the first target keyword replacing the graphical image in the additional text.

10. The system of claim 1, wherein the graphical image is further converted to a second target keyword, wherein the graphical image is further replaced with the second target keyword, and wherein the message content comprises two alternative intents based at least on the digital message having the graphical image replaced by the first target keyword and the second target keyword.

11. The system of claim 1, wherein the message content comprises one of a fraud intent or a noncompliant intent, and wherein the compliance action comprises one of a fraud resolution action or a remediation action to prevent the digital message from being non-compliant with the compliance system.

12. The system of claim 1, wherein the graphical image comprises at least one of an emoji, an emoticon, a facial graphic, or an image generated using the at least one of the plurality of characters or the plurality of symbols.

13. A method comprising:
- accessing messages transmitted by at least one messaging platform of a service provider from a plurality of users;
- determining one or more sequences or one or more layouts of at least a portion of a plurality of characters or a plurality of symbols in the messages;
- determining a plurality of graphical images from the one or more sequences or the one or more layouts;
- determining a plurality of target keywords for the plurality of graphical images, wherein each of the plurality of graphical images is associated with one or more of the plurality of target keywords and the one or more sequences or the one or more layouts in the messages;
- converting each of the plurality of graphical images to one of the plurality of target keywords using a graphical image conversion operation, the plurality of graphical images, and the one or more sequences or the one or more layouts;
- generating, based on the converting, textual mappings of plain text replaceable in the messages for the plurality of graphical images based on each of the plurality of graphical images that is associated with one or more of the plurality of target keywords;
- training a machine learning model for converting the plurality of graphical images to the plurality of target keywords using a machine learning technique, the plurality of graphical images, and the plurality of target keywords;
- implementing the textual mappings and the machine learning model with a content determination system for the service provider that determines a content of an additional message comprising one of the plurality of graphical images that is transmitted via the at least one messaging platform; and
- associating each of the textual mappings with a corresponding compliance action for the textual mappings.

14. The method of claim 13, further comprising:
- receiving the additional message transmitted via the at least one messaging platform from an account of a user, wherein the additional message includes text and the one of the plurality of graphical images in the text;
- determining the one of the plurality of graphic images in the text;
- replacing the one of the plurality of graphical images with one or more corresponding ones of the plurality of target keywords using at least one of the textual mappings or the machine learning model of the content determination system;
- determining the content of the additional message based on the text and the one or more corresponding ones of the plurality of target keywords; and
- determining whether to perform an action with one of the account or the additional message based on the content, wherein the action is required for compliance with one or more compliance rules of the service provider.

15. The method of claim 14, wherein the content comprises one of fraudulent content or malicious content, and wherein the action comprises one of a fraud prevention action or a compliance reporting action.

16. The method of claim 14, further comprising:
- monitoring usage of the account based on determining whether to perform the action, wherein the content indicates a noncompliant usage of the account by the user.

17. The method of claim 14, wherein the content comprises a sentiment of the additional message based on the replacing of the one of the plurality of graphical images with one or more corresponding ones of the plurality of target keywords.

18. The method of claim 13, wherein the messages comprise one of an SMS message, an MMS message, an email, an instant message, a social networking post, or a forum post, and wherein the at least one messaging platform comprises one of an electronic communication service, a social networking platform, a microblogging platform, a data feed, or an electronic forum.

19. A non-transitory machine-readable medium having stored thereon machine-readable instructions executable to cause a machine to perform operations comprising:
- accessing, from an account of a user, a communication transmitted from the account, wherein the communication comprises text and a graphic within the text;
- determining a sequence or a layout of at least one of a plurality of characters or a plurality of symbols in the text of the communication;
- determining the graphic from the sequence or the layout in the text;

determining, using at least one of graphics-to-text mappings or a machine learning model trained to convert graphics into text, at least one target word for the graphic using the sequence or the layout in the communication;

altering the text to include the at least one target word in place of the graphic in plain text in the communication;

determining, using a sentiment analysis system, a contextual intent of the communication based on the altered text; and determining whether the communication includes flagged content based on the contextual intent of the communication.

20. The non-transitory machine-readable medium of claim 19, wherein prior to the accessing, the operations further comprise:

generating the graphics-to-text mappings based on a first plurality of graphics each mapped to one of a target word or a target phrase; and training the machine learning model using a machine learning technique and annotated training data for a second plurality of graphics, wherein the annotated training data provides output classifications for the second plurality of graphics.

\* \* \* \* \*